United States Patent
Fanton et al.

(10) Patent No.: US 11,354,950 B2
(45) Date of Patent: Jun. 7, 2022

(54) AIRCRAFT MONITORING SYSTEM

(71) Applicant: SAFRAN ELECTRONICS & DEFENSE, Boulogne-Billancourt (FR)

(72) Inventors: Nicolas Fanton, Boulogne-Billancourt (FR); Thiebault Jeandon, Boulogne-Billancourt (FR); Emmanuel Couturier, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 16/642,826

(22) PCT Filed: Aug. 16, 2018

(86) PCT No.: PCT/EP2018/072194
§ 371 (c)(1),
(2) Date: Apr. 22, 2020

(87) PCT Pub. No.: WO2019/048203
PCT Pub. Date: Mar. 14, 2019

(65) Prior Publication Data
US 2020/0273264 A1    Aug. 27, 2020

(30) Foreign Application Priority Data
Sep. 6, 2017  (FR) ..................... 17 58213

(51) Int. Cl.
*B64D 45/00* (2006.01)
*B64F 5/60* (2017.01)
(Continued)

(52) U.S. Cl.
CPC ............ *G07C 5/085* (2013.01); *B64D 45/00* (2013.01); *B64F 5/60* (2017.01); *G07C 5/008* (2013.01);
(Continued)

(58) Field of Classification Search
CPC ....................................................... H04W 4/80
See application file for complete search history.

(56) References Cited

U.S. PATENT DOCUMENTS 4,484,283 A  * 11/1984 Verzella ............... G05D 1/0858
                                                               244/17.13
2010/0198514 A1 * 8/2010 Miralles .................. F41G 9/002
                                                               701/302
(Continued)

FOREIGN PATENT DOCUMENTS

FR            3045905 A1    6/2017
WO      WO-02/052818 A1    7/2002
WO   WO-2013/056136 A1    4/2013

Primary Examiner — Joseph H Feild
Assistant Examiner — Pameshanand Mahase
(74) Attorney, Agent, or Firm — Muncy, Geissler, Olds & Lowe, PC

(57) ABSTRACT

A monitoring system including pieces of measuring equipment and an LPWAN reception terminal. Each piece of measuring equipment has a sensor arranged to measure a parameter of the aircraft, an LPWAN antenna and an LPWAN transmitter, an independent power source that powers the piece of measuring equipment, a main cut-off member connected between the independent power source and the LPWAN transmitter, and a main control component arranged to monitor operating parameters of the LPWAN transmitter and to open and close the main cut-off member selectively as a function of the operating parameters.

9 Claims, 2 Drawing Sheets

(51) Int. Cl.
*G01C 23/00* (2006.01)
*G07C 5/08* (2006.01)
*G07C 5/00* (2006.01)
*H04B 7/185* (2006.01)

(52) U.S. Cl.
CPC . *H04B 7/18506* (2013.01); *B64D 2045/0085* (2013.01)

(56) References Cited

U.S. PATENT DOCUMENTS

| | | | | |
|---|---|---|---|---|
| 2014/0241282 | A1* | 8/2014 | Mueller | H04B 15/00 370/329 |
| 2014/0316616 | A1* | 10/2014 | Kugelmass | G06T 11/206 701/8 |
| 2017/0129603 | A1* | 5/2017 | Raptopoulos | G05D 1/0676 |
| 2018/0118376 | A1* | 5/2018 | Ehrstein | G07C 5/0808 |
| 2019/0002120 | A1* | 1/2019 | Vinson | B64D 45/00 |
| 2019/0063678 | A1* | 2/2019 | Ganiger | G01N 33/2888 |

* cited by examiner

AIRCRAFT MONITORING SYSTEM

BACKGROUND OF THE INVENTION

Conventionally, an aircraft monitoring system comprises one or more sensors for monitoring one or more parameters of the aircraft.

Such a monitoring system is used in particular to detect the occurrence of a failure, or else to anticipate the occurrence of a failure by analyzing changes in one or more parameters of the aircraft (a process referred to as health monitoring). Such a monitoring system may also make it possible to validate the presence of any piece of equipment or object in the aircraft.

When designing an aircraft, it is often difficult to integrate a monitoring system. Specifically, the sensors sometimes need to be positioned in locations that are awkward to access, and it is often difficult to ensure that the measurements taken by the sensors are returned to a data concentrator or to maintenance equipment. The cables to which the sensors are connected may present considerable weight and they are sometimes difficult to install. Cables also tend to reduce the reliability of the monitoring system, in particular when they pass through environments subjected to severe environmental constraints (temperature, vibration, impacts, etc.).

The monitoring system is difficult to certify, since the sensors and the cables might interact with numerous external pieces of equipment belonging to other systems, either voluntarily via electrical connections, or else involuntarily by generating various disturbances.

It is even more difficult to integrate and certify a new monitoring system in a pre-existing aircraft. Specifically, under such circumstances, the pre-existing aircraft was not designed to receive the new monitoring system. The new monitoring system must therefore be integrated without disturbing equipment that is external to the monitoring system, which equipment was not designed to operate in the presence of the new monitoring system. It should be observed that this problem is quite considerable, since the life-cycle of an aircraft from the beginning of its design to the end of its lifetime can last for several tens of years. It is therefore fundamental to be able to integrate and certify a new monitoring system of higher performance in a pre-existing aircraft.

OBJECT OF THE INVENTION

An object of the invention is to facilitate integrating and certifying a monitoring system in an aircraft during its design stage or in a pre-existing aircraft.

SUMMARY OF THE INVENTION

In order to achieve this object, there is proposed an aircraft monitoring system comprising an LPWAN network made up of pieces of measuring equipment and an LPWAN reception terminal, the LPWAN reception terminal also being adapted to be connected to maintenance equipment of the aircraft, each piece of measuring equipment comprising:
  a sensor arranged to measure a parameter of the aircraft;
  an LPWAN antenna and an LPWAN transmitter arranged to transmit measurement data produced by the sensor to the LPWAN reception terminal;
  an independent power source that powers the piece of measuring equipment;
  a main cut-off member connected between the independent power source and the LPWAN transmitter; and
  a main control component arranged to monitor operating parameters of the LPWAN transmitter and to open and close the main cut-off member selectively as a function of the operating parameters.

Since each piece of measuring equipment includes its own LPWAN transmitter for transmitting the measurement data and also an independent power source for supplying it with power, only the LPWAN reception terminal needs to be connected to the on-board network. This serves to simplify integrating and certifying the monitoring system of the invention in a new aircraft or in a pre-existing aircraft.

For certification activities, there is a fundamental requirement that any equipment that can transmit radio frequency (RF) energy must comply with the RTCA aviation standard DO-160 Section 21. In particular, this standard requires that the level of RF energy that is transmitted must be below a predetermined threshold for each frequency.

By means of the main cut-off member connected between the independent power source and the LPWAN transmitter, the main control component can deactivate the LPWAN transmitter by physically cutting off its power supply.

The main control component is thus certain to be able to deactivate the LPWAN transmitter in the event of an operating problem that might lead to RF energy being transmitted in a manner that is incompatible with the above-mentioned standard.

This ensures that the measurement equipment will not disturb external equipment under any circumstances, and it ensures that the monitoring system complies with certification requirements.

Other characteristics and advantages of the invention appear on reading the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
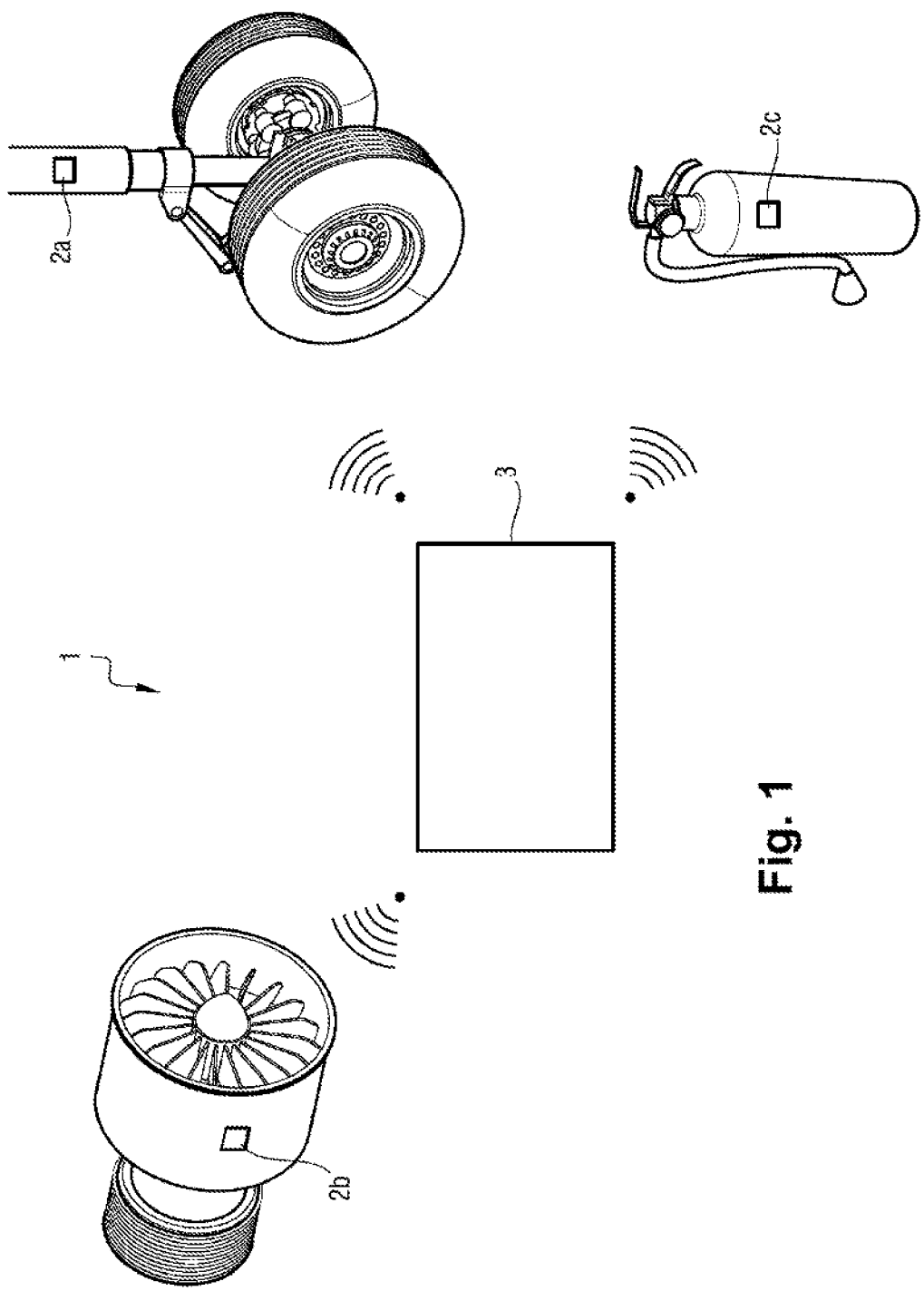
FIG. 1 shows a monitoring system of the invention.

With reference to FIG. 1, the monitoring system of the invention 1 is installed on board an aircraft.

The monitoring system 1 comprises various pieces of measuring equipment 2a, 2b, and 2c, and an LPWAN reception terminal 3. The pieces of measuring equipment 2a, 2b, 2c and the LPWAN reception terminal 3 make up an LPWAN network. The acronym LPWAN stands for Low-Power Wide-Area Network. An LPWAN is technology that provides RF communication of data at a rate that is low and over distances that are long.

In this example, the LPWAN network is a long-range (LoRa) network. Nevertheless, the LPWAN network could be a different LPWAN network, e.g. a Sigfox network.

In this example, all the pieces of measuring equipment 2a, 2b, and 2c are identical at hardware level. The software functions implemented depend on the application in which each piece of measuring equipment 2 is used.

Each piece of measuring equipment 2 operates in two modes of operation: a first mode of operation and a second mode of operation. In the first mode of operation, transmission of LPWAN signals by the measuring equipment 2 is deactivated. In the second mode of operation, transmission of LPWAN signals by the measuring equipment 2 is activated.

The mode of operation used depends on the stage of flight in which the aircraft is to be found. The first mode of operation corresponds to predetermined stages of flight comprising the initial taxiing stage, the takeoff stage, the climb stage, the cruising stage, the descent stage, the approach stage, the landing stage, and the final taxiing stage. The second mode of operation corresponds to the stage in which the aircraft is parked.

Figure 2:
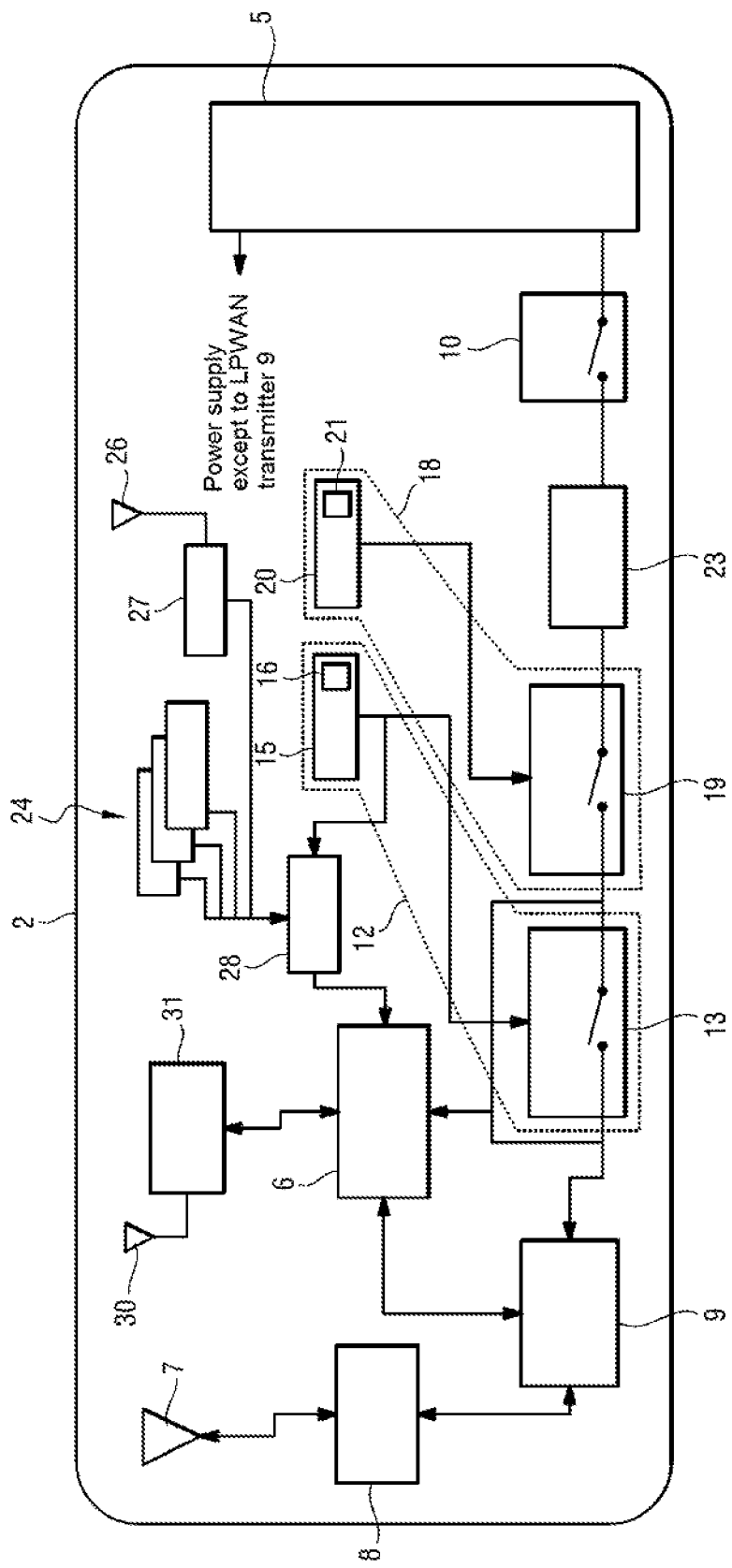
FIG. 2 shows a piece of measuring equipment of the monitoring system of the invention.

With reference to FIG. 2, each piece of measuring equipment 2 includes an independent power source 5 that powers the components of the measuring equipment 2. There is therefore no need to connect the measuring equipment 2 to an external power supply.

In this example, the independent power source 5 comprises a battery having low leakage current (e.g. a battery of the lithium thionyl chloride type).

The measuring equipment 2 also includes a main control component 6. The main control component 6 manages the operation of the entire piece of measuring equipment 2. In this example, the main control component 6 is a microcontroller, however it could be a different component, e.g. a field programmable gate array (FPGA), an application-specific integrated circuit (ASIC), a processor, etc.

The measuring equipment 2 also includes an LPWAN antenna 7, a bandpass filter 8, and an LPWAN transmitter 9.

The bandpass filter 8 is located between the LPWAN transmitter 9 and the LPWAN antenna 7. The bandpass filter 8 passes a predetermined frequency band and strongly attenuates frequencies outside the predetermined frequency band. In this example, the predetermined frequency band is 863 megahertz (MHz) to 928 MHz. At 960 MHz, the rejection of the bandpass filter 8 is equal to at least 60 decibels (dB). In the working passband, the bandpass filter should attenuate as little as possible.

The main control component 6 continuously monitors the configuration parameters of the LPWAN transmitter 9. In particular, the main control component 6 monitors the transmission power setting for the LPWAN signals generated by the LPWAN transmitter 9, and the transmission frequency setting for the LPWAN signals.

The measuring equipment 2 also includes a main cut-off member 10 connected between the independent power source 5 and the LPWAN transmitter 9.

All the components of the measuring equipment 2 are thus powered directly by the independent power source 5, with the exception of the LPWAN transmitter 9 that is powered by the independent power source 5 via the main cut-off member 10.

The main control component 6 opens and closes the main cut-off member 10 selectively. The main cut-off member 10 is normally open (cutting off the power supply to the LPWAN transmitter 9). The cut-off member closes (powering the LPWAN transmitter 9) only when transmission is necessary and authorized.

In the event of detecting a configuration error for the LPWAN transmitter 9, the main control component 6 then generates a failure message specifying that the failure is located in the LPWAN transmitter 9.

Furthermore, the main control component 6 ensures that the LPWAN transmitter 9 does not transmit for more than 3 seconds in every 3600 seconds by opening the main cut-off member 10 after 3 seconds. This limits the amount of RF energy transmitted by the measuring equipment 2.

The measuring equipment 2 also includes first operation detection means 12. The first operation detection means 12 comprise a first secondary cut-off member 13 connected between the independent power source 5 and the LPWAN transmitter 9, together with an accelerometer 15 and a first secondary control component 16 connected to the accelerometer 15.

The first secondary control component 16 is arranged to open and close the first secondary cut-off member 13 selectively.

The accelerometer 15 is a sensor that produces measurements of the acceleration to which the equipment 2 is subjected. The first secondary control component 16 acquires these acceleration measurements, and on the basis of the acceleration measurements, it can detect whether the aircraft is to be found in a stage of flight corresponding to the first mode of operation of the measuring equipment 2.

If so, it is then appropriate to deactivate LPWAN signal transmission. The first secondary control component 16 opens the first secondary cut-off member 13. The power supply to the LPWAN transmitter 9 is thus cut off, and the LPWAN transmitter 9 is thus deactivated and can no longer transmit LPWAN signals. The measuring equipment 2 thus enters the first mode of operation.

The measuring equipment 2 also includes second operation detection means 18. The second operation detection means 18 comprise a second secondary cut-off member 19 connected between the independent power source 5 and the LPWAN transmitter 9, together with a gyro 20 and a second secondary control component 21 connected to the gyro 20.

The second secondary control component 21 is arranged to open and close the second secondary cut-off member 19 selectively.

The gyro 20 is a sensor that produces measurements of the angular position of the measuring equipment 2. The second secondary control component 21 acquires the angular position measurements and, on the basis of the angular position measurements, it can detect whether the aircraft is to be found in a stage of flight corresponding to the first mode of operation of the measuring equipment 2.

If so, it is then appropriate to deactivate LPWAN signal transmission. The second secondary control component 21 opens the second secondary cut-off member 19. The power supply to the LPWAN transmitter 9 is thus cut off, and the LPWAN transmitter 9 is thus deactivated and can no longer transmit LPWAN signals. The measuring equipment 2 thus enters the first mode of operation.

The first secondary control component 16 and the second secondary control component 21 thus operate independently to cut off the power supply to the LPWAN transmitter 9 on the basis of independent measurements of two distinct parameters (acceleration and angular position).

The measuring equipment 2 also includes a current-limiting component 23 connected between the main cut-off member 10 and the LPWAN transmitter 9. The current-limiting component 23 is designed to supply current up to some maximum so as to enable the LPWAN transmitter 9 to transmit a message at the power that is required (but no more), i.e. to generate LPWAN signals at a power that is limited. The current-limiting component 23 thus prevents the LPWAN transmitter 9 from generating LPWAN signals at power greater than a predetermined maximum power. It should be observed that the predetermined maximum power includes an additional margin representing the operating power of the component. This operating margin makes it possible to ensure that the power is sufficient to transmit a message regardless of the conditions in which the measuring equipment 2 is operating: environmental conditions, component tolerances, component ageing, etc.

The main control component 6 monitors the current limiting performed by the current-limiting component 23. When the current being passed by the current-limiting component 23 is greater than the maximum current, the main control component 6 opens the main cut-off member 10.

The combined action of the current-limiting component 23 and of the main cut-off member 10, which is opened by the main control component 6 at the end of 3 seconds of transmission (or earlier), defines the predetermined maximum energy supplied for transmitting LPWAN signals. The energy required is less than or equal to the predetermined maximum energy.

In this example, the maximum energy corresponds to a transmission power of 25 milliwatts (mW) for a duration $\Delta T$ corresponding to the duration of transmitting a message.

The measuring equipment 2 also includes a plurality of sensors 24, including a temperature sensor, a pressure sensor, a humidity sensor, and an impact sensor.

It is not necessary for all of the sensors 24 to be active. The use made of the sensors 24 depends on the application in which the measuring equipment 2 is used.

The measuring equipment 2 also includes a global positioning system (GPS) antenna 26 and a GPS receiver 27. The GPS receiver 27 is a sensor that produces position measurements that serve to estimate a position for the measuring equipment 2.

Measurement data is acquired and stored by a data storage module 28. The measurement data comprises temperature, pressure, humidity, and impact/acceleration measurements as produced by the sensors 24, angular position measurements as produced by the gyro 20, and position measurements as produced by the GPS receiver 27.

The main control component 6 is connected to the data storage module 28 and it produces warning messages when it detects abnormal conditions on the basis of the measurement data, e.g. a temperature that is too high inside an engine nacelle.

The measuring equipment 2 also includes a radio frequency identification (RFID) antenna 30 and a passive RFID transmitter 31 including an RFID memory. The main control component 6 can store any data in the RFID memory.

Thus, when an operative brings an external RFID reader close to the measuring equipment 2, the external RFID reader supplies electrical energy via the RFID antenna 30 to the passive RFID transmitter 31. The passive RFID transmitter 31 is then powered and activated. The passive RFID transmitter 31 transmits the data contained in the RFID memory to the external RFID reader via the RFID antenna 30.

The main control component 6, the first secondary control component 16, and the second secondary control component 21 also perform a function of internally monitoring the measuring equipment 2.

The internal monitoring function consists in testing the measuring equipment 2, in diagnosing a failure in the measuring equipment 2, and in identifying a failed component. The first secondary control component 16 monitors more particularly the first operation detection means 12. The second secondary control component 21 monitors more particularly the second operation detection means 18.

When a failure occurs in the measuring equipment 2, the main control component 6 opens the main cut-off member 10, the first secondary control component 16 opens the first secondary cut-off member 13, or the second secondary control component 21 opens the second secondary cut-off member 19.

The LPWAN transmitter 9 is then no longer powered, and it is not possible to transmit LPWAN signals. The measuring equipment 2 thus enters the first mode of operation.

A failure message is then stored by the main control component 6 in the RFID memory. It is thus possible to obtain information about the failure, even in the absence of any LPWAN signals being transmitted.

The main control component 6 also detects the stage of flight in which the aircraft is to be found by using the measurement data supplied by the sensors 24, by the accelerometer 15, by the gyro 20, and by the GPS receiver 27.

The main control component 6 then adapts the sampling frequencies of the sensors 24, of the accelerometer 15, of the gyro 20, and of the GPS receiver 27 to match the stage of flight in which the aircraft is to be found.

Adapting a sampling frequency to the stage of flight serves to reduce the sampling frequency in a stage of flight that does not require measurements to be taken at a high frequency, thereby reducing the energy consumption of the measuring equipment 2 and thus increasing its battery lifetime.

By way of example, it is known that engine nacelles are heavily stressed during certain stages of flight. In particular, a nacelle is subjected to large variations in temperature and in levels of vibration during the takeoff and climb stages of the aircraft, and to large variations in pressure during the descent, approach, and landing stages of the aircraft. It is thus appropriate, during these stages, to make use of a high sampling frequency for the temperature, pressure, and impact sensors. In contrast, this sampling frequency can be reduced during other stages of flight.

Mention is made below of applications in which the measuring equipment can be used.

The measuring equipment 2 comprises a first piece of equipment 2a, a second piece of equipment 2b, and a third piece of equipment 2c.

The first piece of measuring equipment 2a is positioned on landing gear of the aircraft. The first piece of measuring equipment 2a is for measuring one particular parameter of the aircraft, specifically the impacts to which the aircraft is subjected during each landing.

The first piece of measuring equipment 2a thus produces measurement data comprising the impact measurements, and it stores the measurement data. It is thus possible, on the basis of the impact measurements, for the first piece of measuring equipment 2a to detect a "hard" landing. The first piece of measuring equipment 2a produces a warning message when a hard landing is detected.

The measurement data, the warning messages, and the failure messages are transmitted by the first piece of measuring equipment 2a to the LPWAN reception terminal 3. The measurement data and the warning messages serve in particular to perform predictive maintenance of the landing gear, and also to perform overall monitoring of landing gear in a fleet of aircraft.

The second piece of measuring equipment 2b is positioned on the nacelle of an engine of the aircraft. The second piece of measuring equipment 2b is for measuring various parameters of the aircraft, and specifically a temperature and a pressure existing within the nacelle. The second piece of measuring equipment 2b thus produces measurement data comprising temperature measurements and pressure measurements, and it stores the measurement data. On the basis of the temperature and pressure measurements, the second piece of measuring equipment 2b can likewise detect abnormal operating conditions. The second piece of measuring equipment 2b produces a warning message when abnormal conditions are detected.

The measurement data, the warning messages, and the failure messages are transmitted by the second piece of measuring equipment 2b to the LPWAN reception terminal 3. The measurement data and the warning messages serve in particular to perform predictive maintenance of the nacelle and of the engine, and also to perform overall monitoring of nacelles in a fleet of aircraft.

The third piece of measuring equipment 2c is positioned on a container (or unit load device (ULD)) positioned in the aircraft.

The third piece of measuring equipment 2c is for measuring climatic conditions inside the container on which the third piece of measuring equipment 2c is positioned, and specifically pressure, temperature, impacts, and humidity.

The third piece of measuring equipment 2c thus produces measurement data, and it stores the measurement data.

The measurement data, the warning messages, and the failure messages are transmitted by the third piece of measuring equipment 2c to the LPWAN reception terminal 3. The measurement data enable the container to be geolocated with good accuracy in order to ensure that the container is indeed positioned within the aircraft.

The LPWAN reception terminal 3 controls of the LPWAN network made up of the pieces of measuring equipment 2 and the LPWAN reception terminal 3.

The LPWAN reception terminal 3 includes an LPWAN transceiver. The LPWAN reception terminal engages in unidirectional wireless communication with the pieces of measuring equipment: the pieces of measuring equipment 2 transmit LPWAN signals to the LPWAN reception terminal 3, which receives said LPWAN signals.

The LPWAN reception terminal 3 receives and stores the measurement data, the warning messages, and the failure messages transmitted to the LPWAN reception terminal 3 by the pieces of measuring equipment 2.

The LPWAN reception terminal 3 is also connected to the on-board network of the aircraft. The LPWAN reception terminal 3 is connected by a power supply cable to a power source of the aircraft, which serves to power the LPWAN reception terminal 3. The LPWAN reception terminal 3 is also connected by a communication cable to maintenance equipment of the aircraft. The LPWAN reception terminal 3 transmits the measurement data, the warning messages, and the failure messages to the maintenance equipment of the aircraft.

The maintenance equipment forms part of a maintenance system of the aircraft. The role of the maintenance system is in particular to receive, to process, and to transmit the measurement data, the warning messages, and the failure messages to first ground equipment. The measurement data, the warning messages, and the failure messages then enable maintenance operations to be organized, which operations may comprise replacing, adjusting, testing, or monitoring a piece of equipment, for example. The LPWAN reception terminal 3 may also be connected directly to second ground equipment including an LPWAN transceiver. The first ground equipment and the second ground equipment could possibly comprise a single piece of equipment.

The LPWAN reception terminal 3 can communicate with the second piece of ground equipment when the aircraft is on the ground, and also while the aircraft is in flight.

In this example, the LPWAN reception terminal 3 downloads all of the measurement data, the warning messages, and the failure messages coming from all the pieces of measuring equipment 2 in the LPWAN network by transmitting to the second piece of ground equipment when the aircraft is on the ground and stationary (during a stage of parking).

There follows a description of certain advantages procured by the monitoring system of the invention.

The pieces of measuring equipment 2, which communicate with the LPWAN reception terminal 3 via a wireless link and which are fitted with respective independent power sources 5, are themselves mechanically integrated in various different zones without any physical interface with the on-board network of the aircraft. This serves to simplify integrating the monitoring system 1 in the aircraft, reduces its weight (because of the absence of cables), and increases its reliability. Only the LPWAN reception terminal 3 is connected to the airplane network. Thus, only the LPWAN reception terminal 3 needs to be integrated in the airplane network, which requires difficult certification work.

For each piece of equipment, transmitting LPWAN signals requires little transmit power.

This ensures that the measuring equipment 2 can be installed in the aircraft without disturbing external equipment, and this can be done without any need to investigate in detail the impact on all of the external equipment that might potentially be concerned by RF energy being transmitted in the predetermined 863 MHz-928 MHz frequency band.

It is stated above that LPWAN signals can be transmitted only in the second mode of operation, when the aircraft is in the aircraft parking stage. It should be observed that, even if a failure should occur in the first operation detection means 12 or in the second operation detection means 18, thereby preventing deactivation of the transmission of LPWAN signals while the aircraft is in a stage of flight corresponding to the first mode of operation, transmission is nevertheless limited to a level that is less than the limits of the RTCA aviation standard DO-160 Section 21. Transmission therefore does not disturb external equipment.

The electricity consumption of each piece of measuring equipment 2 is also relatively low, as a result of using LPWAN technology. Pieces of measuring equipment 2 are thus obtained that present an operating lifetime that is considerable, without any need to make use of an independent power source that is particularly expensive or bulky.

Naturally, the invention is not limited to the embodiment described, but covers any variant coming within the ambit of the invention as defined by the claims.

It is stated above that the pieces of measuring equipment are all identical in terms of hardware. That need not necessarily be true. By way of example, each piece of measuring equipment could be fitted with a respective distinct sensor that depends on the application in which the piece of measuring equipment is to be used.

It is stated above that the LPWAN reception terminal engages in unidirectional communication with the pieces of measuring equipment. This communication could be bidirectional, and the LPWAN transmitter of a piece of measuring equipment could be an LPWAN transceiver.

Mention is made of a first mode of operation and of a second mode of operation for the measuring equipment. In the first mode of operation, transmission of LPWAN signals by the measuring equipment is deactivated. It is entirely possible for a piece of measuring equipment to operate in only one mode of operation, and for the transmission of LPWAN signals not to be deactivated. It is possible to imagine deactivating transmission of LPWAN signals during stages of flight other than the stages mentioned.

It is stated that the independent power source comprises a battery with low leakage current. Alternatively, it is possible to use one or more different batteries, and even to use means for recovering or "harvesting" energy. By way of example, the energy harvesting means could transform the vibration generated by an engine into electrical energy that is used for powering a piece of measuring equipment.

The invention claimed is:

1. An aircraft surveillance system comprising a Low-Power Wide-Area Network (LPWAN) network made up of pieces of measuring equipment and an LPWAN reception terminal, the LPWAN reception terminal also being adapted to be connected to maintenance equipment of the aircraft, each piece of measuring equipment comprising:
   a sensor arranged to measure a parameter of the aircraft;
   an LPWAN antenna and an LPWAN transmitter arranged to transmit measurement data produced by the sensor to the LPWAN reception terminal;
   an independent power source that powers the piece of measuring equipment;
   a main cut-off member connected between the independent power source and the LPWAN transmitter, the main cut-off member having an open state and a closed state, the LPWAN transmitter being powered by the independent power source via the main cut-off member; and
   a main control component arranged to monitor operating parameters of the LPWAN transmitter and to open and close the main cut-off member selectively as a function of the operating parameters.

2. The monitoring system according to claim 1, wherein the piece of measuring equipment further comprises a current-limiting component connected between the main cut-off member and the LPWAN transmitter.

3. The monitoring system according to claim 2, wherein combined action of the current-limiting component and of the main cut-off member serves to define a predetermined maximum energy for transmitting LPWAN signals.

4. The monitoring system according to claim 1, wherein the piece of measuring equipment is arranged to detect a stage of flight in which the aircraft is to be found, and wherein a sampling frequency for the sensor is adapted as a function of the stage of flight.

5. The monitoring system according to claim 1, wherein the main control component and the main cut-off member are separate and distinct components.

6. The monitoring system according to claim 1, wherein individual sensor power units are only energized for different specific phases of flight.

7. The monitoring system according to claim 1, wherein the operating parameters comprise a transmission power and a transmission frequency for LPWAN signals generated by the LPWAN transmitter, and wherein the main control component is arranged to open the main cut-off member when the transmission power is greater than a predetermined power threshold and/or when the transmission frequency lies outside a predetermined frequency band.

8. An aircraft surveillance system comprising a Low-Power Wide-Area Network (LPWAN) network made up of pieces of measuring equipment and an LPWAN reception terminal, the LPWAN reception terminal also being adapted to be connected to maintenance equipment of the aircraft, each piece of measuring equipment comprising:
   a sensor arranged to measure a parameter of the aircraft;
   an LPWAN antenna and an LPWAN transmitter arranged to transmit measurement data produced by the sensor to the LPWAN reception terminal;
   an independent power source that powers the piece of measuring equipment;
   a main cut-off member connected between the independent power source and the LPWAN transmitter, the main cut-off member having an open state and a closed state; and
   a main control component arranged to monitor operating parameters of the LPWAN transmitter and to open and close the main cut-off member selectively as a function of the operating parameters,
   wherein the piece of measuring equipment further comprises a first secondary cut-off member connected between the independent power source and the LPWAN transmitter, and an accelerometer and a first secondary control component connected to the accelerometer and arranged to open the first secondary cut-off member when the first secondary control component detects that the aircraft is in a predetermined stage of flight.

9. An aircraft surveillance system comprising a Low-Power Wide-Area Network (LPWAN) network made up of pieces of measuring equipment and an LPWAN reception terminal, the LPWAN reception terminal also being adapted to be connected to maintenance equipment of the aircraft, each piece of measuring equipment comprising:
   a sensor arranged to measure a parameter of the aircraft;
   an LPWAN antenna and an LPWAN transmitter arranged to transmit measurement data produced by the sensor to the LPWAN reception terminal;
   an independent power source that powers the piece of measuring equipment;
   a main cut-off member connected between the independent power source and the LPWAN transmitter, the main cut-off member having an open state and a closed state; and
   a main control component arranged to monitor operating parameters of the LPWAN transmitter and to open and close the main cut-off member selectively as a function of the operating parameters,
   wherein the piece of measuring equipment further comprises a second secondary cut-off member connected between the independent power source and the LPWAN transmitter, and a gyro and a second secondary control component connected to the gyro and arranged to open the second secondary cut-off member when the second secondary control component detects that the aircraft is in a predetermined stage of flight.

* * * * *